(12) United States Patent
Tamura (10) Patent No.: US 9,723,279 B1
(45) Date of Patent: Aug. 1, 2017

(54) PROJECTOR AND METHOD OF CONTROLLING PROJECTOR

(71) Applicant: SEIKO EPSON CORPORATION, Tokyo (JP)

(72) Inventor: Akihiko Tamura, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/391,132

(22) Filed: Dec. 27, 2016

(30) Foreign Application Priority Data

Jan. 21, 2016 (JP) ................. 2016-009609

(51) Int. Cl.
*H04N 9/31* (2006.01)
(52) U.S. Cl.
CPC ......... *H04N 9/3179* (2013.01); *H04N 9/3147* (2013.01)
(58) Field of Classification Search
USPC ............... 348/744, 745, 751; 353/30, 31, 34
See application file for complete search history.

(56) References Cited

U.S. PATENT DOCUMENTS

| | | | | |
|---|---|---|---|---|
| 5,463,434 | A * | 10/1995 | Kanayama | H04N 13/0404 348/E13.029 |
| 5,881,165 | A * | 3/1999 | Tanaka | G03F 9/70 382/151 |
| 8,648,964 | B2 | 2/2014 | Ishibashi et al. | |
| 9,578,295 | B1 * | 2/2017 | Morrison | H04N 9/3185 |
| 2002/0057457 | A1 * | 5/2002 | Nozaki | G03B 27/521 358/1.18 |
| 2006/0279662 | A1 * | 12/2006 | Kapellner | H04N 5/7416 348/744 |
| 2007/0273842 | A1 * | 11/2007 | Morrison | G03B 21/14 353/97 |
| 2010/0092040 | A1 * | 4/2010 | Fischer | G01B 11/25 382/106 |
| 2011/0019108 | A1 * | 1/2011 | Nelson | H04N 9/31 348/745 |
| 2011/0234920 | A1 * | 9/2011 | Nelson | H04N 9/3147 348/745 |
| 2012/0105813 | A1 * | 5/2012 | Todoroki | H04N 9/3194 353/69 |

FOREIGN PATENT DOCUMENTS

JP 2015-158884 A 9/2015
WO 2012/073649 A1 6/2012

* cited by examiner

*Primary Examiner* — Paulos M Natnael
(74) *Attorney, Agent, or Firm* — Oliff PLC (57) ABSTRACT

A projector adapted to project an image includes an imaging section adapted to image a projection surface on which the image is projected, and output an image obtained by imaging, an identification section adapted to identify a projection area in which the image is projected based on the image output by the imaging section, a mask processing section adapted to mask an outside of an area, which includes the projection area identified by the identification section, on the image output by the imaging section, a discrimination section adapted to determine which one of a first state, in which the projector is used alone, and a second state, in which the projector and another projector project images side by side, is set, and a setting section adapted to set an area to be masked by the mask processing section in accordance with a determination result of the discrimination section.

6 Claims, 9 Drawing Sheets

PROJECTOR AND METHOD OF CONTROLLING PROJECTOR

The entire disclosure of Japanese Patent Application No. 2016-009609, filed Jan. 21, 2016 is expressly incorporated by reference herein.

BACKGROUND

1. Technical Field

The present invention relates to a projector, and a method of controlling a projector.

2. Related Art

As an invention for detecting the position of a pointing element located on an image projected by a projector, there can be cited a projector disclosed in JP-A-2015-158884. The projector shoots a surface, on which the projector projects an image, with a camera, and then masks other areas than the area, in which the image is displayed by the projector, in the image obtained by shooting. The projector detects the light emitted by the pointing element in the area, which is not masked out of the image taken by the camera, to identify the position of the pointing element located on the image projected. The position thus identified is used in a drawing function of drawing a line corresponding to the movement locus of the pointing element. According to this configuration, since the outside light and the illumination light existing in the area in which the image is not projected become no longer detected, it is possible to prevent the light from other objects than the pointing element from being detected, and thus, it is possible to accurately detect the position of the pointing element.

When projecting an image using projectors, there is a technology so-called tiling in which a plurality of projectors is arranged to arrange a plurality of images projected to thereby project a larger image than the image projected by a single projector. When performing the display with a tiling technology, in some cases, the pointing element is moved straddling the projection ranges of the respective projectors to draw a line corresponding to the movement locus of the pointing element. In this case, if the masking described above is performed in each of the projectors, in each of the projectors, the identification of the position of the pointing element is performed after the pointing element enters the range of the image projected by the own projector. Here, if the motion of the pointing element is fast, the projector identifies the position distant from the boundary between the image projected by the own projector and the image projected by another projector, and then starts drawing from that point. Therefore, the line to be drawn fails to be connected to the line drawn by another projector to fail to form a continuous line.

SUMMARY

An advantage of some aspects of the invention is to provide a technology of resolving a problem in the process corresponding to the pointing element moving so as to straddle images when projecting the images side by side with a plurality of projectors.

An aspect of the invention provides a projector adapted to project an image, including a projection section adapted to project an image, an imaging section adapted to image a projection surface on which the image is projected, and output an image obtained by imaging, an identification section adapted to identify a projection area in which the image is projected in the projection surface based on the image output by the imaging section, a mask processing section adapted to mask an outside of an area, which includes the projection area identified by the identification section, on the image output by the imaging section, a discrimination section adapted to determine which one of a first state, in which the projector is used alone, and a second state, in which the projector and another projector project images side by side, is set, and a setting section adapted to set an area to be masked by the mask processing section in accordance with a determination result of the discrimination section.

According to this aspect of the invention, it is possible to resolve a problem in the process corresponding to the pointing object moving so as to straddle images when projecting the images side by side with a plurality of projectors.

The aspect of the invention may be configured such that, in a case in which the determination result of the discrimination section is the second state, the setting section sets the area masked on a side of the image, which is projected by the another projector, to be narrower than in the first state.

According to this configuration, in the case of projecting the images side by side with a plurality of projectors, it is possible to identify the position of the pointing element located in the area of the image projected by the another projector.

The aspect of the invention may be configured such that the setting section sets a shape of the area masked by the mask processing section in accordance with a positional relationship between the image projected by the projector and the image projected by the another projector.

According to this configuration, in the case of projecting the images side by side with a plurality of projectors, it is possible to identify the position of the pointing element located in the area of the image projected by the another projector.

The aspect of the invention may be configured such that, in a case in which the determination result of the discrimination section is the second state, the setting section eliminates a part of the image projected by the another projector from the range to be masked, to set the area to be masked to be narrower than in the first state.

According to this configuration, in the case of projecting the images side by side with a plurality of projectors, it is possible to identify the position of the pointing element located in the area of the image projected by the another projector.

The aspect of the invention may be configured such that the second state is a state in which the image projected by the projector and the image projected by the another projector have contact with, or overlap each other.

According to this configuration, in the case of projecting the images side by side with a plurality of projectors, it is possible to identify the position of the pointing element located in the area of the image adjacent to the image projected by the own projector.

Another aspect of the invention provides a method of controlling a projector including a projection section adapted to project an image and an imaging section adapted to image a projection surface on which the image is projected, and output an image obtained by imaging, the method including the steps of identifying a projection area in which the image is projected in the projection surface based on the image output by the imaging section, masking an outside of an area, which includes the projection area identified in the identifying the projection area, on the image output by the imaging section, determining which one of a first state, in which the projector is used alone, and a second state, in which the projector and another projector project images side by side, is set, and setting an area to be masked in the masking the outside of the area in accordance with a determination result in the determining of the first state or the second state.

According to this aspect of the invention, it is possible to resolve a problem in the process corresponding to the pointing element moving so as to straddle images when projecting the images side by side with a plurality of projectors.

BRIEF DESCRIPTION OF THE DRAWINGS

The invention will be described with reference to the accompanying drawings, wherein like numbers reference like elements.

DESCRIPTION OF AN EXEMPLARY
EMBODIMENT

Embodiment

Configuration of Embodiment

Figure 1:
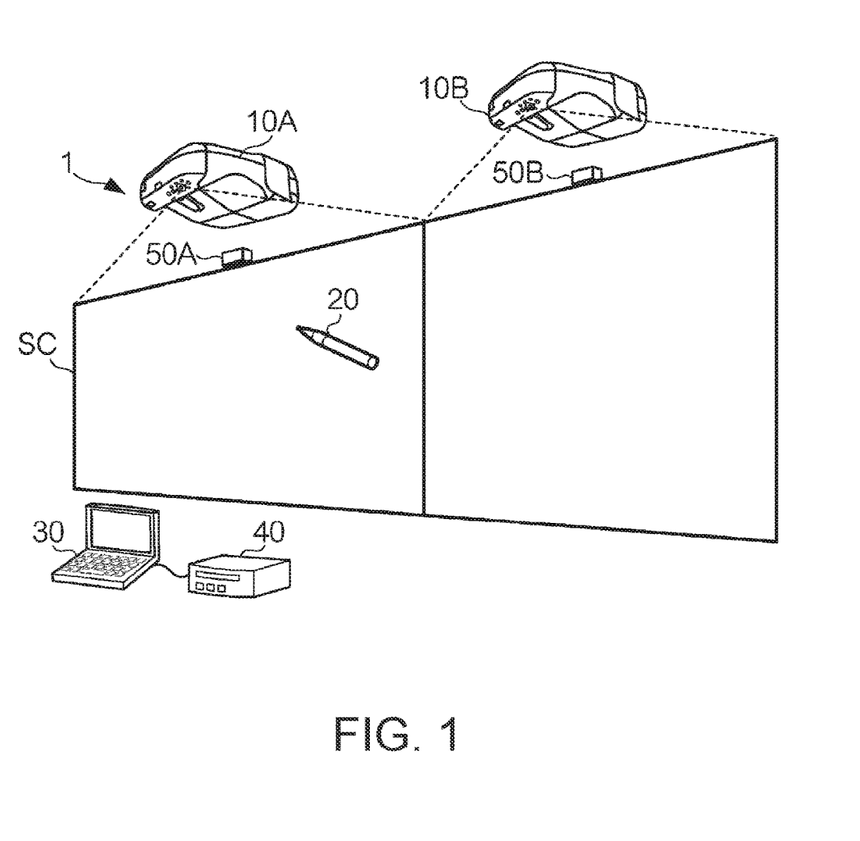
FIG. 1 is a diagram showing devices constituting a display system 1.

FIG. 1 is a diagram showing devices constituting a display system 1 according to an embodiment of the invention. The display system 1 is constituted by projectors 10A, 10B each for projecting an image on a screen SC to be a display surface, a pointing element 20, light emitting devices 50A, 50B, an information processing device 30, and a distribution device 40.

The projectors 10A, 10B as examples of the display devices project an image represented by a video signal, which is supplied from another device, on the screen SC. The video signal is an example of image information representing the image. Further, the projectors 10A, 10B are each provided with a PC operation function for using the pointing element 20 as a pointing device (a digitizer) for the information processing device 30, a drawing function for drawing an image at a position pointed by the pointing element 20, and so on. The projectors 10A, 10B are disposed obliquely above the screen SC, and project the picture toward the screen SC. It should be noted that although in the present embodiment, the projectors 10A, 10B project the picture toward the screen SC, it is also possible to project the picture on a wall surface (the display surface) instead of the screen SC. Further, in the present embodiment, the projectors 10A, 10B have a configuration of being mounted on the wall surface with a bracket, but can also be mounted on the ceiling or a desk. Further, it is also possible to project the picture on the desk instead of the screen SC.

The pointing element 20 shaped like a pen functions as a pointing device in the case of using the drawing function or the PC operation function described above, and is used in the case in which the user operates the graphical user interface (GUI) of the information processing device 30 projected by the projectors 10A, 10B, the case in which the user performs drawing over the image thus projected in an overlapping manner, and so on.

In the present embodiment, the information processing device 30 is a personal computer.

The distribution device 40 is a device for distributing the video signal, which is supplied from the information processing device 30, to the projectors 10A, 10B. The distribution device 40 generates a video signal to be supplied to the projector 10A and a video signal to be supplied to the projector 10B from the video signal supplied from the information processing device 30, and then supplies the projectors 10A, 10B with the video signals thus generated. In the present embodiment, the distribution device 40 divides the image, which is represented by the video signal supplied from the information processing device 30, into right and left two images, supplies the video signal of the left image (a first part) to the projector 10A, and supplies the video signal of the right image (a second part) to the projector 10B. It should be noted that the distribution device 40 is arranged to be able to supply the video signal, which is supplied from the information processing device 30, directly to only either one of the projector 10A and the projector 10B due to the operation of the button provided to the distribution device 40 itself.

When the projector 10A is supplied with the first part of the video signal from the distribution device 40, the projector 10A projects the left image represented by the video signal thus supplied, and when the projector 10B is supplied with the second part of the video signal from the distribution device 40, the projector 10B projects the right image represented by the video signal thus supplied. By displaying (performing so-called tiling display) the left image to be projected by the projector 10A and the right image to be projected by the projector 10B arranged on the respective sides, it is possible to display the image of the video signal, which is supplied by the information processing device 30, in a larger size than in the case of performing the projection with a single projector.

Further, in the case in which the distribution device 40 supplies the video signal, which has been supplied from the information processing device 30, directly to only either one of the projector 10A and the projector 10B, the one of the projector 10A and the projector 10B projects the image of the video signal supplied by the information processing device 30.

The light emitting devices 50A, 50B each have a light emitting section for irradiating a finger located on the screen SC with light (infrared light in the present embodiment). The light emitting devices 50A, 50B are disposed above an upper end of the screen SC, and emit the light dispersed downward in a range of an angle θ. The light emitted from the light emitting devices 50A, 50B forms a layer of light extending along the screen SC. In the present embodiment, the angle θ reaches about 180 degrees, and thus, the layer of light is formed on the roughly entire area of the screen SC. It is preferable for the surface of the screen SC and the layer of light formed by the light emitting devices 50A, 50B to be adjacent to each other. The layer of light is made to be thick so that a finger located at a position distant from the surface of the screen SC can also be irradiated. Further, it is also possible to stack the layers of the light emitting section to irradiate a finger located at a distant position. Emission of the light from the light emitting device 50A is controlled by the projector 10A, and emission of the light from the light emitting device 50B is controlled by the projector 10B.

Figure 2:
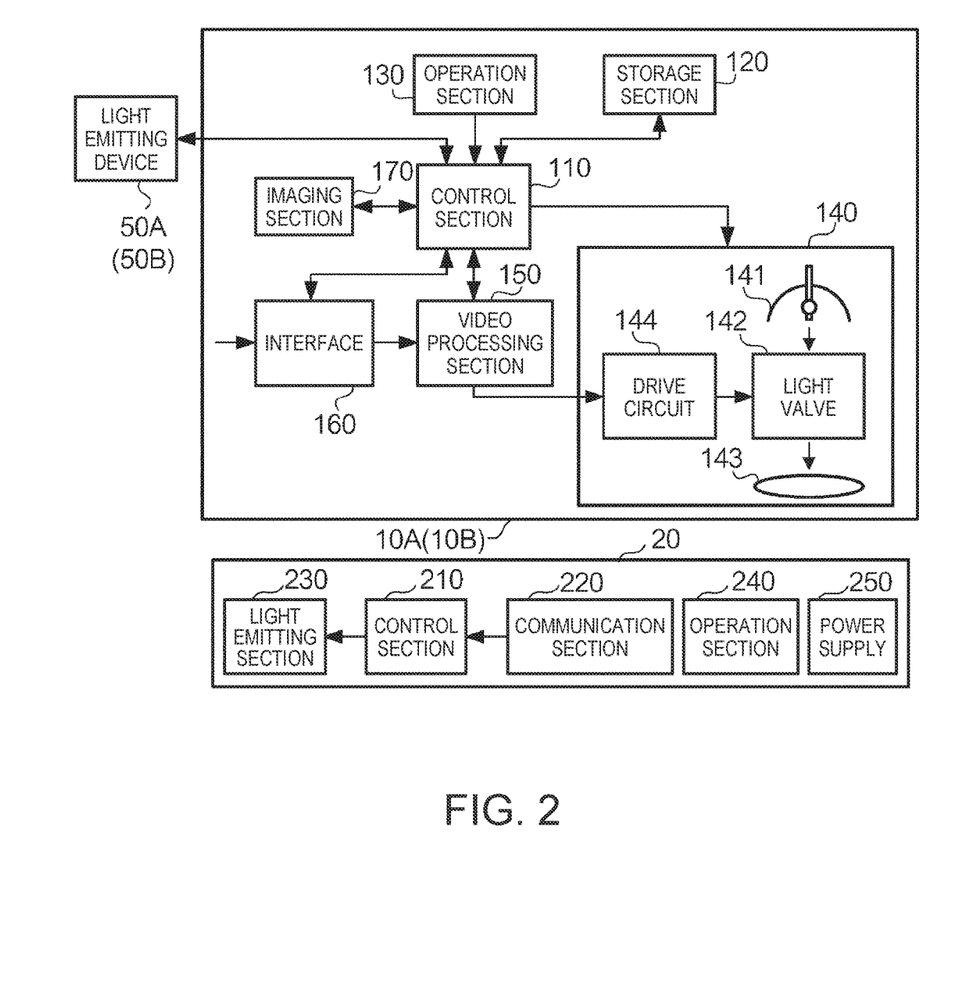
FIG. 2 is a diagram showing a hardware configuration of projectors 10A, 10B and a pointing element 20.

FIG. 2 is a diagram showing a hardware configuration of the projectors 10A, 10B and the pointing element 20. The pointing element 20 has a control section 210, a communication section 220, a light emitting section 230, an operation section 240, and a power supply 250. The power supply 250 is, for example, a dry battery or a secondary cell, and supplies the control section 210, the light emitting section 230, and the operation section 240 with electric power. The operation section 240 is provided with a switch (not shown) for controlling the supply of the electric power from the power supply 250 to each of the sections. When the switch of the operation section 240 is set to the ON state, the electric power is supplied from the power supply 250 to each of the sections, and when the switch of the operation section 240 is set to the OFF state, the supply of the electric power from the power supply 250 to each of the sections is stopped. The light emitting section 230 has a light emitting diode for emitting infrared light, and is disposed on the tip of the pointing element 20. The control section 210 controls lighting and extinction of the light emitting section 230. The light emitting section 230 is a point light source, and the light emitted by the light emitting section 230 spreads from the tip of the pointing element 20 in a spherical manner. The communication section 220 receives a variety of signals transmitted from the projector 10 with the infrared light. The communication section 220 converts the variety of signals thus received into electric signals, and then supplies the control section 210 with the electric signals. The control section 210 is connected to the light emitting section 230 and the communication section 220. The control section 210 starts the control of the light emitting section 230 in accordance with the signal supplied from the communication section 220 to control lighting and extinction of the light emitting diode of the light emitting section 230.

The projectors 10A, 10B are each provided with a control section 110, a storage section 120, an operation section 130, and a projection section 140. Further, the projectors 10A, 10B are each provided with a video processing section 150, an interface 160, and an imaging section 170. In the present embodiment, the hardware configurations of the projectors 10A, 10B are the same as each other. Hereinafter, in the following description, in the case in which it is necessary to distinguish the sections of the projectors 10A, 10B from each other, "A" is added to the tail of the reference numeral of each of the sections of the projector 10A, "B" is added to the tail of the reference numeral of each of the sections of the projector 10B for the sake of convenience of explanation, and in the case in which there is no need to distinguish the sections from each other, addition of "A" and "B" to the tails of the reference numerals is omitted. Further, in the case in which there is no need to distinguish between the projector 10A and the projector 10B, the description is presented with the reference of the projector 10.

The interface 160 has a plurality of connectors supplied with a video signal such as RCA, D-Sub, or HDMI (registered trademark), and supplies the video processing section 150 with the video signals, which are supplied from other devices to the connectors. Further, the interface 160 has an interface for wireless communication such as a wireless LAN (local area network) or Bluetooth (registered trademark) and an interface for wired communication such as USB (universal serial bus) or a wired LAN. The interface 160 communicates with the information processing device 30, the distribution device 40, and so on. Further, the interface 160 is provided with a light emitting diode for emitting infrared light. The interface 160 is controlled by the control section 110 in lighting and extinction of the light emitting diode, and transmits an infrared signal for controlling lighting and extinction of the light emitting section 230 of the pointing element 20. Further, the interface 160 is provided with a light receiving section for receiving the infrared signal from a remote controller not shown.

The storage section 120 stores a setting value related to the image quality of the picture to be projected and information related to a variety of functions. The operation section 130 is provided with a plurality of buttons for operating the projector 10. By the control section 110 controlling each of the sections in accordance with the buttons having been operated, an adjustment of the picture to be projected on the screen SC, setting of a variety of functions provided to the projector 10, and so on are performed.

The video processing section 150 obtains the video signal supplied from the interface 160. Further, the video processing section 150 obtains a signal of an on-screen image such as an on-screen image to be displayed by a drawing function or a GUI for operating the projector 10 from the control section 110. The video processing section 150 is provided with a variety of image processing functions, and performs image processing on the video signal supplied from the interface 160 to adjust the image quality of the picture to be projected. In the case in which the video processing section 150 is supplied with the signal of the on-screen image from the control section 110, the video processing section 150 supplies the projection section 140 with the video signal on which the signal of the on-screen image is superimposed.

The projection section 140 for projecting the picture includes a light source 141, a light valve 142, a drive circuit 144, and a projection optical system 143. The light source 141 is a lamp for emitting light, and the light emitted by the light source 141 is dispersed by a plurality of dichroic mirrors and mirrors not shown into light beams of red, green, and blue, and the light beams of red, green, and blue obtained by the dispersion are guided to the light valve 142. It should be noted that the light source 141 can also be a light emitting diode or a semiconductor laser device for emitting a laser beam instead of the lamp.

The drive circuit 144 obtains the video signal supplied from the video processing section 150. The video signal supplied to the drive circuit 144 includes grayscale data representing a grayscale of a red component in the image to be projected, grayscale data representing a grayscale of a green component in the image to be projected, and grayscale data representing a grayscale of a blue component in the image to be projected. The drive circuit 144 extracts the grayscale data of each of the colors of red, green, and blue to drive the light valve 142 based on the grayscale data of each of the colors thus extracted.

The light valve 142 includes a liquid crystal light valve to which the red light beam described above is input, a liquid crystal light valve to which the green light beam described above is input, and a liquid crystal light valve to which the blue light beam described above is input. The liquid crystal light valves are each a transmissive liquid crystal panel, and are each provided with pixels arranged in a matrix with a plurality of rows and a plurality of columns. The liquid crystal light valve to which the red light beam is input is driven based on the red grayscale data, the liquid crystal light valve to which the green light beam is input is driven based on the green grayscale data, and the liquid crystal light valve to which the blue light beam is input is driven based on the blue grayscale data. In each of the liquid crystal light valves, the drive circuit 144 controls each of the pixels to vary the transmittance of the pixel. By controlling the transmittance of the pixels, the light beams of the respective colors having been transmitted through the respective liquid crystal light valves form the images corresponding to the respective grayscale data. The images of the light beams of red, green, and blue having been transmitted through the respective liquid crystal light valves are combined with each other by a dichroic prism not shown, and then enter the projection optical system 143. The projection optical system 143 is an optical system for enlarging the image having entered the projection optical system 143, and projects the image having entered the projection optical system 143 on the screen SC in an enlarged manner using a lens or a mirror. When the image is projected on the screen SC, the image is displayed on the screen SC as the display surface. It should be noted that it is also possible to adopt reflective liquid crystal panels instead of the transmissive liquid crystal panels, or it is also possible to use a digital mirror device.

The projector 10 has the imaging section 170 in order to identify the position of the pointing element 20. The imaging section 170 is provided with an imaging element (e.g., CMOS or CCD) for receiving the infrared light emitted by the light emitting section 230, an optical system for forming an image on the imaging element, an aperture for limiting the light entering the imaging element, and so on. The imaging section 170 takes the projection range of the projection section 140 as an imaging range, generates an image of the range thus imaged, and then outputs an image signal representing the image thus generated. It should be noted that in the present embodiment, since the projectors 10A, 10B are installed obliquely above the screen SC, it results that the imaging section 170 images the projection range from obliquely above.

The control section 110 is a microcomputer provided with a central processing unit (CPU), a read only memory (ROM), and a random access memory (RAM). When the CPU executes a program stored in the ROM, the control section 110 controls each of the sections to realize a function of projecting a picture on the screen SC, the PC operation function, the drawing function, and so on described above in each of the projectors 10A, 10B.

Figure 3:
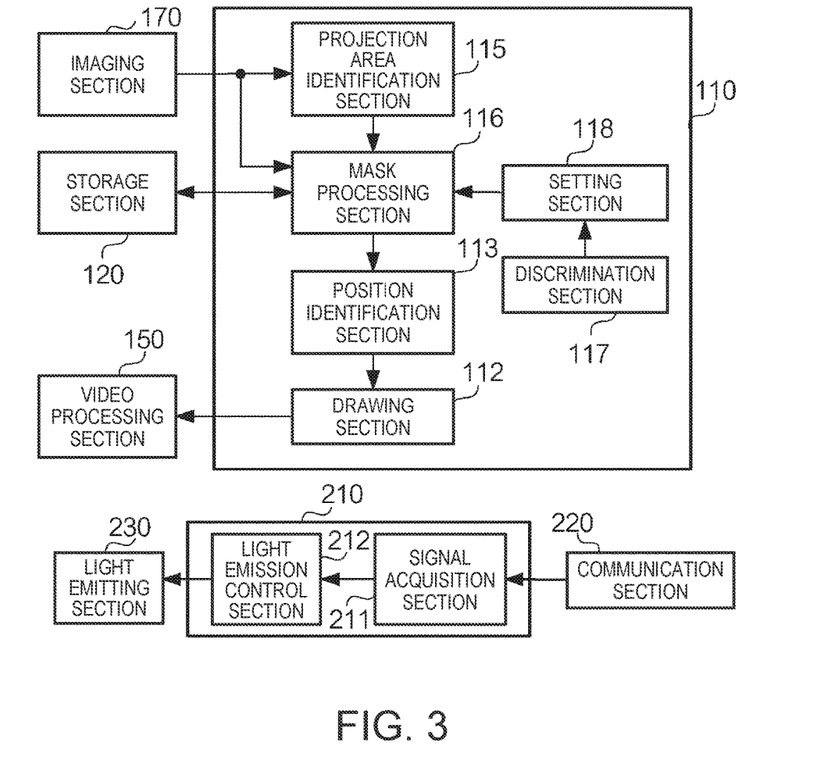
FIG. 3 is a functional block diagram of functions realized in a control section 110.

FIG. 3 is a functional block diagram showing a configuration of the functions realized by the control section 110 executing programs, and the functions realized by the control section 210. Firstly, there will be described the functions realized by the control section 110 of the projector 10.

A projection area identification section 115 analyzes the image output by the imaging section to identify the projection area in which the image is projected in the projection surface on which the image is projected by the projector 10. A mask processing section 116 performs masking of the outside of the area, which includes the projection area identified by the projection area identification section 115, on the image output by the imaging section. A discrimination section 117 determines which one of a first state, in which the own projector is used alone, and a second state, in which the own projector and another projector project images side by side, is set. A setting section 118 sets the area masked by the mask processing section 116 in accordance with the determination result of the discrimination section 117.

Figure 4:
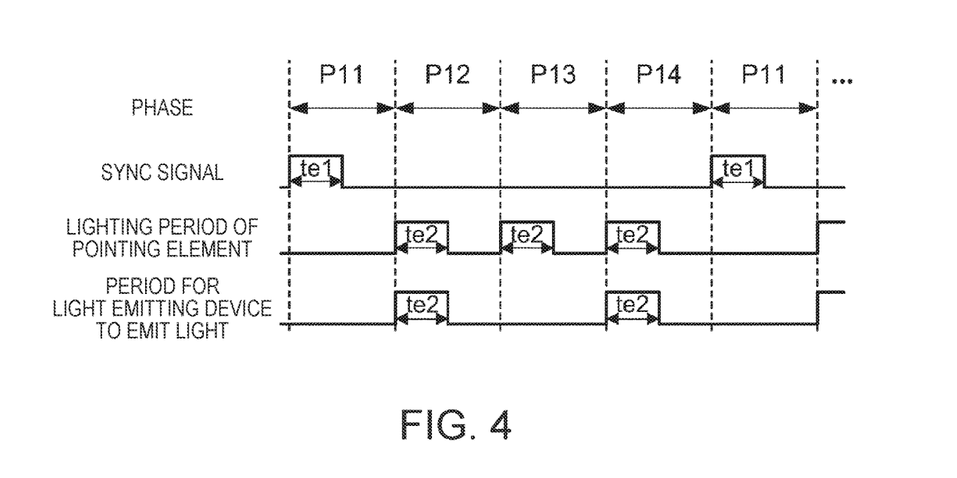
FIG. 4 is a diagram showing an example of a time chart of detecting the pointing element.

A position identification section 113 periodically identifies the position of the light emitting section 230 of the pointing element 20 in the image on which masking has been performed by the mask processing section 116 with the time chart shown in, for example, FIG. 4. The period for identifying the position of the finger or the position of the light emitting section 230 includes four phases, namely a phase P11 through a phase P14 as shown in FIG. 4. When detecting the position of the finger or the position of the light emitting section 230, the phases P11 through P14 are repeated. The phase P11 is a phase for synchronizing the timing, at which the projector 10 performs imaging with the imaging section 170, with the timing, at which the pointing element 20 emits light, and the timing, at which the light emitting device 50 emits the infrared light. In the phase P11, the position identification section 113 controls the light emitting diode of the interface 160 so that a sync signal of the infrared light is output in a predetermined period te1.

In the pointing element 20, the communication section 220 receives the light of the sync signal, and when a predetermined time has elapsed after receiving the sync signal, the control section 210 controls the light emitting section 230 so that the light emitting section 230 lights in the period te2 set in advance. In the present embodiment, the light emitting section 230 is controlled so as to light from a starting point of each of the phases P12, P13, and P14. Further, the position identification section 113 controls the light emitting device 50 so that the light emitting device 50 emits the infrared light in the period te2 from the starting point of each of the phase P12 and the phase P14.

In the phases P12 through P14, the position identification section 113 controls the imaging section 170 to image the predetermined range including the screen SC at a preset shutter speed. In the imaging section 170, an exposure period, in which the exposure is performed using the electronic shutter function, begins at the starting point of each of the phases P12 and P14, and the point at which the exposure ends is determined in accordance with the shutter speed set to the imaging section 170. The image signal of the image taken by the imaging section 170 in the exposure period of each of the phases P12 through P14, and on which masking has been performed by the mask processing section 116, is supplied to the position identification section 113.

The position identification section 113 identifies the position of the finger or the light emitting section 230 located on the image projected using the image on which masking has been performed by the mask processing section 116. Specifically, in the phase P12 and the phase P14, in the case in which the infrared light emitted by the light emitting device 50 is irradiated to the finger, the infrared light, which has been emitted from the light emitting device 50 and then reflected by the finger, is reflected in the image obtained by the imaging section 170. Further, in the phase P12 and the phase P14, if the light emitting section 230 is located on the image projected, the infrared light having been emitted by the light emitting section 230 is also reflected in the image obtained by the imaging section 170. In the phase P13, since the light emitting device 50 does not emit the light, the infrared light emitted by the light emitting section 230 is reflected in the image obtained by the imaging section 170.

The position identification section 113 identifies the position of the infrared light reflected in the image obtained by the imaging section 170 in the phases P12 through P14. The position identification section 113 identifies the infrared light located at the position close to the position of the infrared light, the position of which has been identified in the phase P13, out of the infrared light, the positions of which have been identified in the phases P12 and P14, and then determines the position of the infrared light thus identified as the position of the light emitting section 230. Further, the position identification section 113 determines the position of the infrared light distant from the infrared light, the position of which has been identified in the phase P13, as the position of the finger out of the infrared light, the positions of which have been identified in the phases P12 and P14. It should be noted that in the case in which the infrared light does not exist on the image projected in the phase P13, the position identification section 113 determine the position identified in the phases P12 and P14 as the position of the finger. These positions identified are used when performing the variety of functions such as the drawing function or the PC operation function.

A drawing section 112 performs drawing in accordance with the position detected by the position identification section 113 on the image presently being projected.

Then, there will be described the functions realized by the control section 210 of the pointing element 20. A signal acquisition section 211 obtains a sync signal received by the communication section 220. A light emission control section 212 obtains the sync signal from the signal acquisition section 211, and then controls the light emitting section 230 so that the light emitting section 230 lights in the period te2 in each of the phases P12 through P14 when a predetermined time elapses after the sync signal is obtained.

Operation Example of Embodiment

Then, an operation example of the present embodiment will be described. When the user uses the function of using the pointing element 20 such as the PC operation function or the drawing function described above, the user firstly makes the projector 10 perform the calibration process. The calibration process is a process of the calibration disclosed in, for example, JP-A-2015-158884. The calibration process is a process of making the position in the image projected by the projection section 140 correspond to the position on the image (hereinafter referred to as a shot image, for the sake of convenience of explanation) represented by the image signal supplied from the imaging section 170.

The position of the pointing element 20 identified by the position identification section 113 from the shot image is a position on the shot image, and is represented by a coordinate system set in the shot image. The user operates the pointing element 20 to the image (hereinafter referred to as a projection image for the sake of convenience of explanation) projected on the screen SC, and in the case in which the drawing function is set to the ON state, the projectors 10A, 10B perform drawing in accordance with the position of the pointing element 20, and therefore, it is necessary for the projectors 10A, 10B to identify the position of the pointing element 20 to the projection image.

Therefore, the projectors 10A, 10B generate calibration data for converting the coordinate of the pointing element 20 identified in the shot image into the coordinate of the projection image using the calibration process. The calibration data is the data for making the coordinate set in the shot image and the coordinate set in the projection image correspond to each other, and can be, for example, a table for making the coordinate of the shot image and the coordinate of the projection image correspond one-to-one to each other, or can also be a function for converting the coordinate of the shot image into the coordinate of the projection image.

Figure 5:
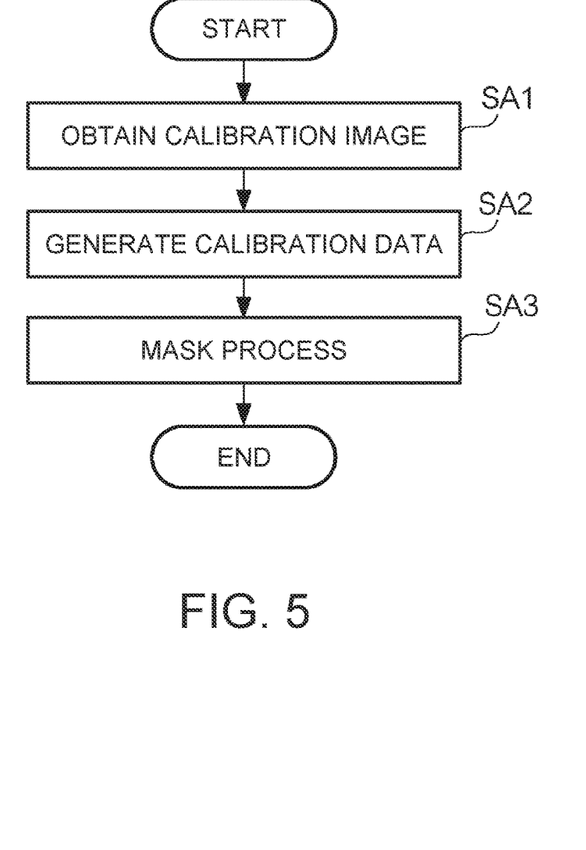
FIG. 5 is a flowchart showing the flow of a calibration process.

FIG. 5 is a flowchart showing the flow of the calibration process. The control section 110 firstly obtains (step SA1) the calibration image to be used in the calibration process from the storage section 120. The control section 110 supplies the calibration image obtained from the storage section 120 to the video processing section 150. The video processing section 150 supplies the projection section 140 with the video signal representing the calibration image supplied. The projection section 140 projects the calibration image represented by the video signal supplied.

The control section 110 controls the imaging section 170 to shoot the image thus projected. The imaging section 170 shoots the calibration image projected and the periphery of the calibration image to output the image signal representing the image of the range imaged.

Figure 6:
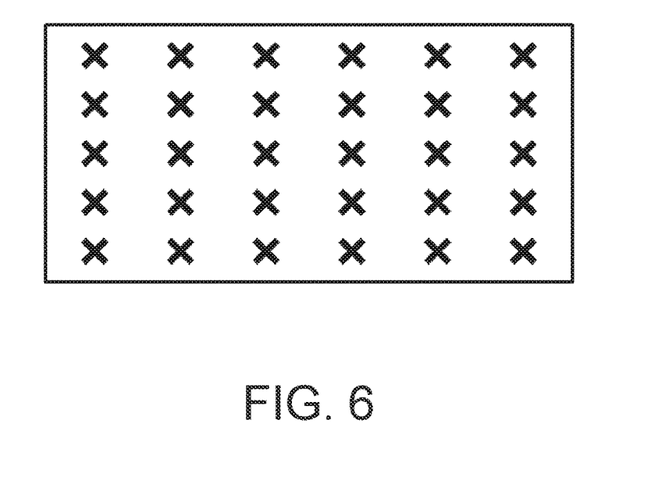
FIG. 6 is a diagram showing an example of a calibration image.

FIG. 6 is a diagram showing an example of the calibration image. In the calibration image, there is arranged a plurality of marks at predetermined intervals. The marks in the calibration image are figures or symbols which can be detected in the shot image, and the shape and the size are not particularly limited.

Figure 7:
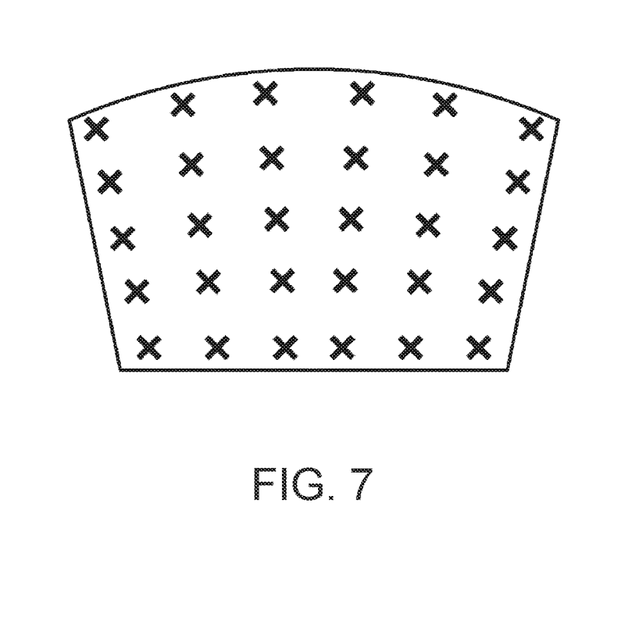
FIG. 7 is a diagram showing an example of a shot image.

FIG. 7 is a diagram showing an example of the shot image represented by the image signal supplied from the imaging section 170 having shot the calibration image. In the case of installing the projector 10 obliquely above the screen SC, since the imaging section 170 shoots the screen SC from obliquely above, the shot image becomes a distorted image to the projection image. As shown in FIG. 6, the projection image is the calibration image having a rectangular shape with the marks arranged at regular intervals, but in the shot image, the projection image shows in the distorted state as shown in FIG. 7, and the intervals between the marks arranged in the shot image are different depending on the positions of the marks.

Then, the control section 110 (the projection area identification section 115) generates (step SA2) the calibration data. Specifically, the control section 110 obtains the image signal supplied from the imaging section 170. The control section 110 detects the marks from the shot image represented by the image signal obtained to obtain the centroid position of each of the marks as the coordinate value of the mark. The control section 110 associates the marks detected in the shot image with the image projected, namely the marks in the calibration image. The control section 110 associates the coordinate values of the marks in the shot image and the coordinate values of the marks in the projection image with each other to thereby generate the calibration data having a table form or a function form. The coordinate values of the marks in the calibration image are stored in the storage section 120 in advance together with the calibration image, or included in the calibration image. In the case in which the calibration data has already been stored, the control section 110 updates the calibration data stored. Further, the control section 110 identifies the projection area (the projection image) in the shot image based on the coordinate values of the marks in the shot image.

Then, the control section 110 (the mask processing section 116) performs (step SA3) the mask process. The mask process is a process for generating a mask image for setting a grayscale value determined in advance to the outside of the area including the projection image in the shot image. By superimposing the mask image on the shot image, the outside of the area including the projection image is masked in the shot image, and thus, the outside light and the illumination light existing in the area on which no image is projected are no longer detected when the control section 110 identifies the position of the pointing element 20.

Figure 8:
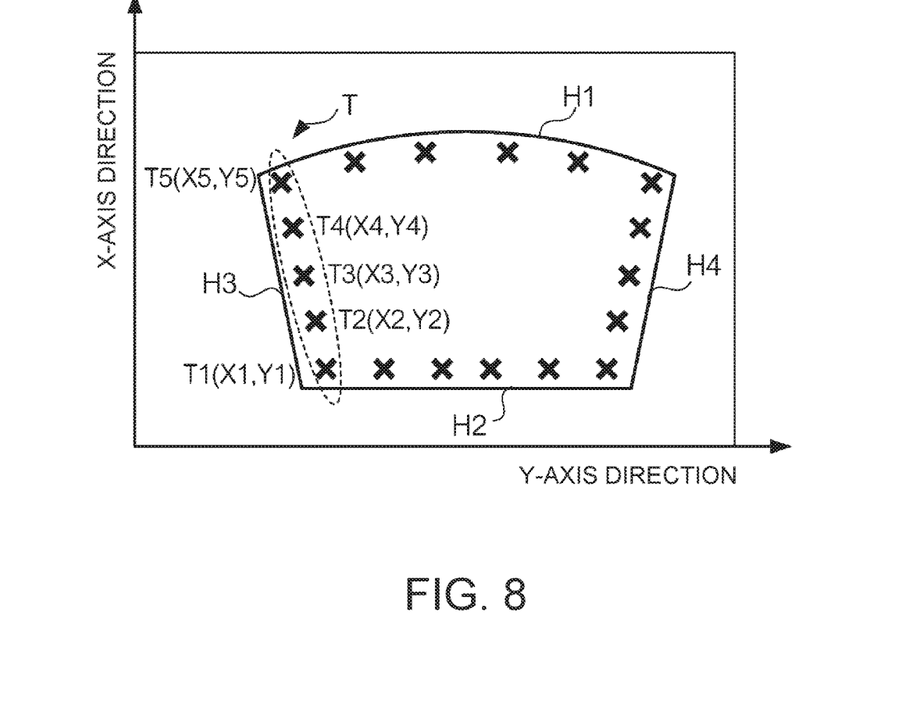
FIG. 8 is a diagram showing an example of a shot image.

The mask process will be described using FIG. 8. FIG. 8 is a diagram showing an example of the shot image. The control section 110 obtains the data representing which ones of the marks included in the calibration image form the mark row located outermost in each of the upper, lower, right, and left directions. The data is stored in the storage section 120 so as to be associated with, for example, the calibration image. In the example shown in FIG. 8, the mark row located outermost on the left side of the calibration image is the mark row T. The control section 110 obtains the center coordinate of each of the marks included in the mark row T from the calibration data. The control section 110 adds a value determined in advance to the center coordinate of each of the marks thus obtained to determine an end of the area (hereinafter referred to as a detection area for the sake of convenience of explanation) in which the position of the pointing element 20 is detected.

For example, the mark row T is the mark row located outermost on the left side of the calibration image, and therefore, the value determined in advance is subtracted from the Y coordinate value of each of the marks to obtain the coordinate value of the left end of the detection area. In the case of the mark T3 (X3, Y3) of the mark row T shown in FIG. 8, the coordinate (X3, Y3-a), which is obtained by subtracting the value a determined in advance from the Y coordinate value Y3, becomes the left end of the detection area in the case in which the coordinate in the X-axis direction is X3. It should be noted that the value of a is set so that the detection area includes the projection area.

The control section 110 obtains the coordinate value of the end of the detection area in each of the upper, lower, right, and left directions of the projection image. It should be noted that regarding the area where the mark does not exist, it is also possible to obtain the coordinate values of the ends using an interpolation process. The control section 110 stores the coordinate values of the side H1, the side H2, the side H3, and the side H4 thus obtained in the storage section 120.

Then, the control section 110 generates the mask image using the coordinate values of the detection area thus obtained. Here, the control section 110 generates the mask image set so that the grayscale value becomes 0 in the areas outside the range of the detection area. The control section 110 stores the mask image thus generated in the storage section 120.

The control section 110 (the mask processing section 116) having terminated the calibration process obtains the mask image stored in the storage section 120 and then masks the shot image with the mask image when identifying the position of the pointing element 20.

Figure 9:
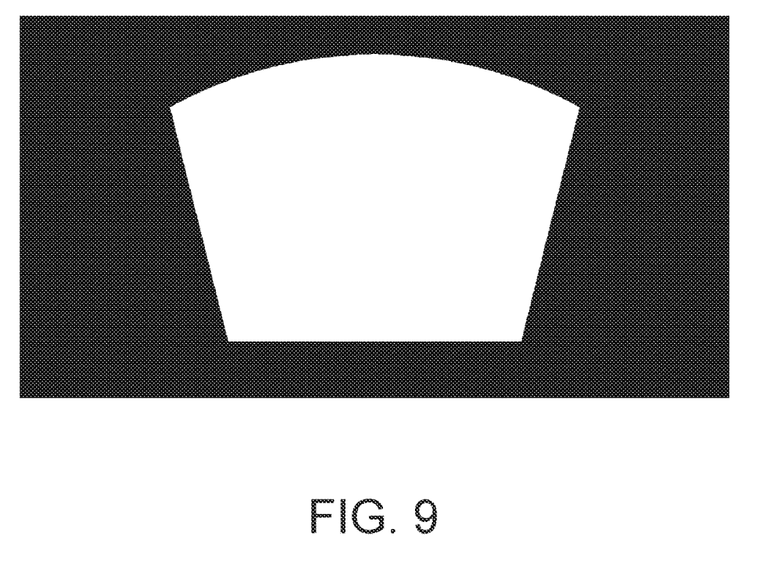
FIG. 9 is a diagram showing an example of a mask image.
Figure 10:
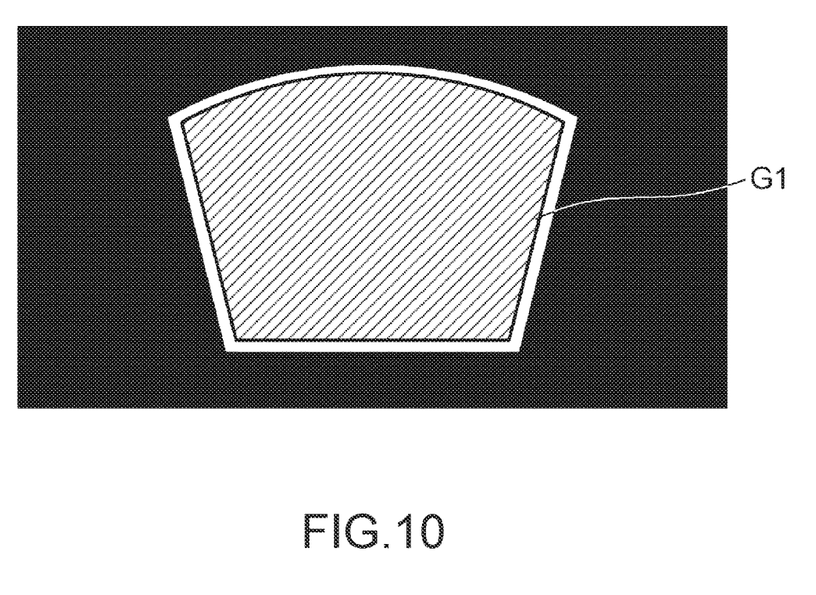
FIG. 10 is a diagram showing an example of a shot image to which masking is provided.

FIG. 9 is a diagram showing an example of the mask image. In FIG. 9, the white area corresponds to the detection area. Further, FIG. 10 is a diagram showing an example of the shot image masked with the mask image. In FIG. 10, the hatched area indicates the area of the projection image G1, and the black area indicates the area of the mask image. Further, in the shot image, a part located outside the projection area shows in the area between the projection image and the mask image. In the case of identifying the position of the pointing element 20, the control section 110 masks the shot image with the mask image as shown in FIG. 10, and thus, the control section becomes not to detect the outside light and the illumination light existing outside the projection area.

Then, an operation example in the case of performing the tiling display with the projectors 10A, 10B will be described. The user firstly performs the operation of expanding the detection area before performing the tiling display. Specifically, the user performs an operation of instructing display of a setup screen for setting the detection area using the remote controller. When the operation is performed with the remote controller, the control section 110 supplies the video processing section 150 with the signal of the on-screen image of the setup screen for setting the detection area. When the video processing section 150 supplies the projection section 140 with the signal of this on-screen image, the setup screen for setting the detection area is projected on the screen SC.

Figure 11:
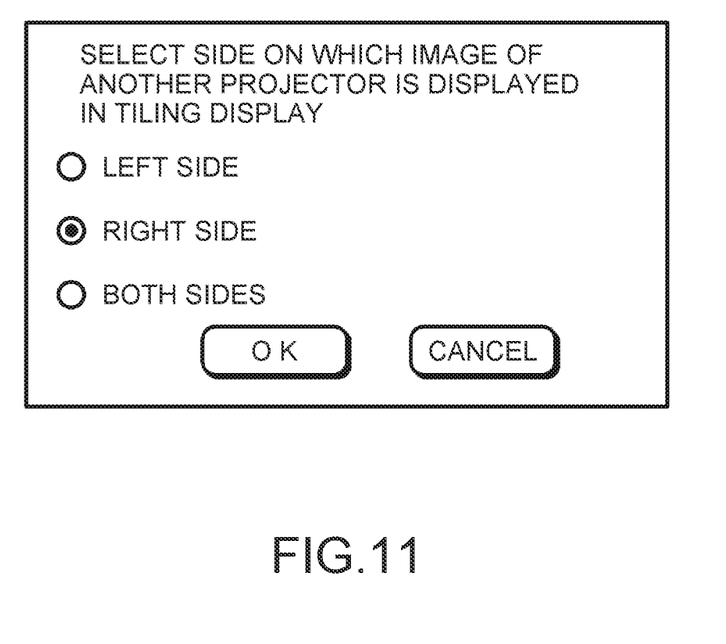
FIG. 11 is a diagram showing an example of a setup screen.

FIG. 11 is a diagram showing an example of the setup screen. The user operates the remote controller to set the relative position of the projection image of the projector, which performs the tiling display together with the projector displaying the setup screen, to the projection image of the projector displaying the setup screen when performing the tiling display. For example, in the case in which the projection image of the projector 10B is projected next to the projection image of the projector 10A as shown in FIG. 1, the user selects the right side in the setup screen shown in FIG. 11 in the projector 10A, and selects the left side in the setup screen shown in FIG. 11 in the projector 10B.

In the case in which the right side is selected and then the operation of holding down the OK button is performed in the setup screen shown in FIG. 11, the control section 110A of the projector 10A obtains the mask image stored in the storage section 120A. The control section 110A deforms the mask image so that the detection area is expanded to the right in the mask image thus obtained, and then stores the mask image thus deformed in the storage section 120A.

Further, in the case in which the left side is selected and then the operation of holding down the OK button is performed in the setup screen shown in FIG. 11, the control section 110B of the projector 10B obtains the mask image stored in the storage section 120B. The control section 110B deforms the mask image so that the detection area is expanded to the left in the mask image thus obtained, and then stores the mask image thus deformed in the storage section 120B.

Figure 12A:
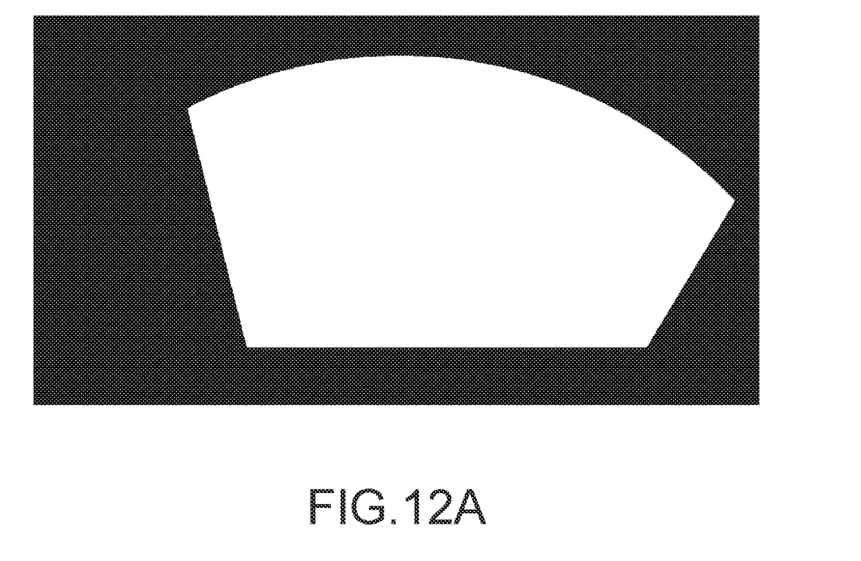
FIGS. 12A and 12B are diagrams showing an example of a mask image.
Figure 12B:
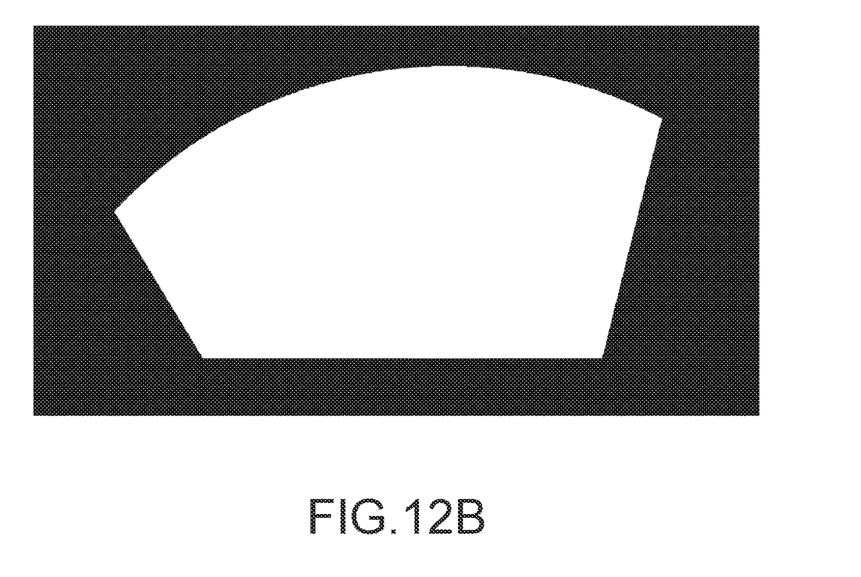

FIG. 12A is a diagram showing an example of the mask image with the detection area expanded to the right, and FIG. 12B is a diagram showing an example of the mask image with the detection area expanded to the left. In the case in which the function of the tiling display is in the ON state, the control section 110A (the setting section 118) obtains the mask image thus deformed from the storage section 120A. The control section 110A (the mask processing section 116) masks the shot image with the mask image thus obtained. Further, in the case in which the function of the tiling display is in the ON state, the control section 110B (the setting section 118) obtains the mask image thus deformed from the storage section 120B. The control section 110B (the mask processing section 116) masks the shot image with the mask image thus obtained. It should be noted that the ON/OFF state of the function of the tiling display is set by the user operating the remote controller. The control section 110 (the discrimination section 117) determines whether the state (the first state) of using the projector alone is set, or the state (the second state) of performing the tiling display is set in accordance with the result of the setting by the user.

Figure 13A:
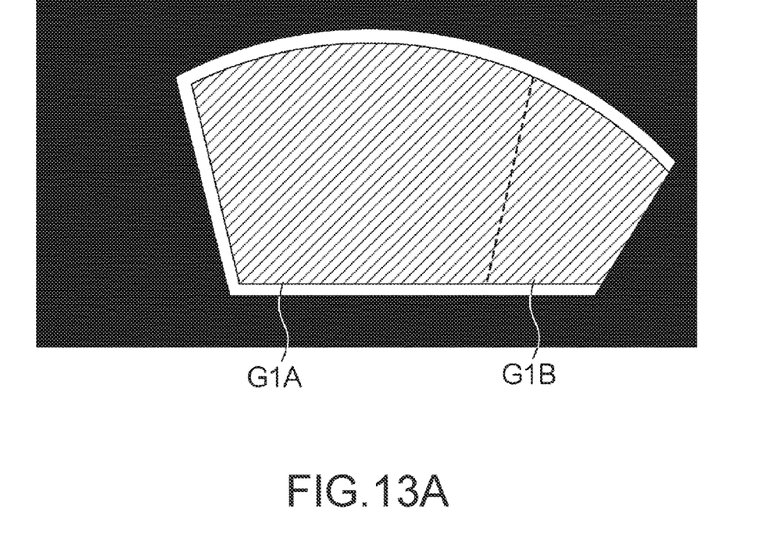
FIGS. 13A and 13B are diagrams each showing an example of a shot image to which masking is provided.

FIG. 13A is a diagram showing an example of the state of masking the shot image, which is obtained by the imaging section 170A, with the mask image shown in FIG. 12A. In FIG. 13A, the hatched area indicates the area in which the whole of the projection image G1A of the projector 10A and at least a part of the projection image G1B of the projector 10B show, and the black area indicates the area of the mask image. Further, in the shot image, a part located outside the projection area shows in the area between the projection image and the mask image.

In the projector 10A, since a part of the projection image of the projector 10B is included in the detection area, in the case in which the pointing element 20 has moved from the inside of the area of the projection image of the projector 10B toward the projection image of the projector 10A, it is possible to identify the position of the pointing element 20 before the pointing element 20 enters the area of the projection image of the projector 10A.

In the case in which the drawing function is in the ON state, and the pointing element 20 has moved from the inside of the area of the projection image of the projector 10B to the area of the projection image of the projector 10A, the control section 110A projects an image of a line connecting the position of the pointing element 20 before entering the area of the projection image of the projector 10A and the position of the pointing element 20 when having entered the area of the projection image of the projector 10A to each other. Thus, even in the case in which the pointing element 20 moves straddling the projection image of the projector 10A and the projection image of the projector 10B, it is possible to project the line drawn in the projector 10A and the line drawn in the projector 10B so as to be connected to each other.

Figure 13B:
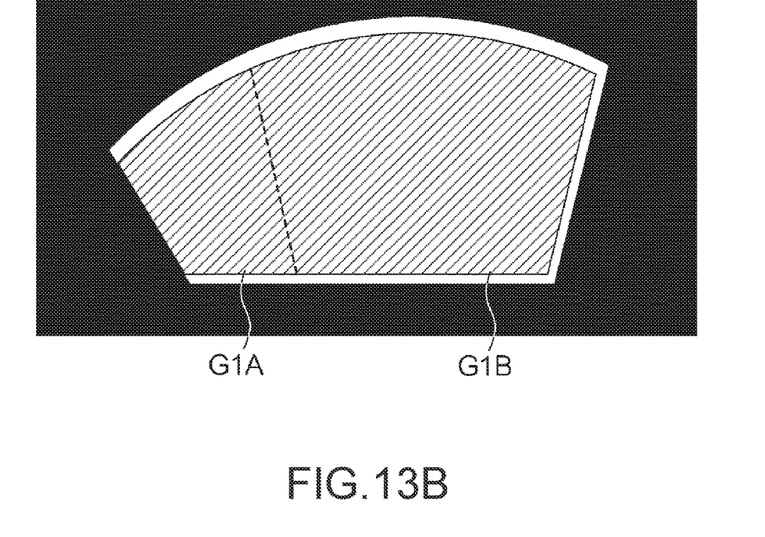

Further, FIG. 13B is a diagram showing an example of the state of masking the shot image, which is obtained by the imaging section 170B, with the mask image shown in FIG. 12B. In FIG. 13B, the hatched area indicates the area in which at least a part of the projection image G1A of the projector 10A and the whole of the projection image G1B of the projector 10B show, and the black area indicates the area of the mask image. Further, in the shot image, a part located outside the projection area shows in the area between the projection image and the mask image.

In the projector 10B, since a part of the projection image of the projector 10A is included in the detection area, in the case in which the pointing element 20 has moved from the inside of the area of the projection image of the projector 10A toward the projection image of the projector 10B, it is possible to identify the position of the pointing element 20 before the pointing element 20 enters the area of the projection image of the projector 10B.

In the case in which the drawing function is in the ON state, and the pointing element 20 has moved from the inside of the area of the projection image of the projector 10A to the area of the projection image of the projector 10B, the control section 110B projects an image of a line connecting the position of the pointing element 20 before entering the area of the projection image of the projector 10B and the position of the pointing element 20 when having entered the area of the projection image of the projector 10B to each other. Thus, even in the case in which the pointing element 20 moves straddling the projection image of the projector 10A and the projection image of the projector 10B, it is possible to project the line drawn in the projector 10A and the line drawn in the projector 10B so as to be connected to each other.

Modified Examples

Although the embodiment of the invention is described hereinabove, the invention is not limited to the embodiment described above, but can be implemented in other various forms. For example, the invention can be implemented by modifying the embodiment described above as follows. It should be noted that the embodiment described above and the following modified examples can be implemented alone or in arbitrary combination.

Although in the embodiment described above, the projection image of the projector 10A and the projection image of the projector 10B are projected so as to have contact with each other, it is also possible to project the projection image of the projector 10A and the projection image of the projector 10B so as to be separated from each other.

In the invention, it is also possible to project the images side by side with three or more projectors 10. In this case, in the projector 10 projecting an image, on both sides of which images of other projectors are projected, "BOTH SIDES" is selected in the setup screen shown in FIG. 11. If "BOTH SIDES" is selected in the setup screen shown in FIG. 11, the projector 10 deforms the mask image so that the detection area is expanded to both of the right and left sides in the mask image generated in the calibration process, and then stores the mask image thus deformed in the storage section 120. In the case in which it is necessary to identify the position of the pointing element 20, the control section 110 obtains the mask image thus deformed from the storage section 120, and then masks the shot image with the mask image thus obtained.

In the embodiment described above, the timing of deforming the mask image generated in the calibration process comes after the setup is performed on the setup screen shown in FIG. 11, but is not limited to this timing. For example, it is also possible to adopt a configuration in which the mask image with the detection area expanded to the right and the mask image with the detection area expanded to the left are generated when generating the mask image in the step SA3. Further, it is also possible to arrange that the mask image corresponding to the setup thus performed is used in the case in which the user performs the setup on the setup screen shown in FIG. 11.

In the embodiment described above, the projectors 10A, 10B are arranged horizontally, and the pictures projected by the projectors 10A, 10B are arranged horizontally, but the invention is not limited to this configuration. For example, it is also possible that the pictures are arranged vertically by respectively projecting the pictures in the horizontal direction from the two projectors arranged vertically wherein in the projector for projecting the upper picture, the outside of an area including the whole of the upper picture and a part of the lower picture close to the upper part is set to the area of the mask image, and in the projector for projecting the lower picture, the outside of an area including the whole of the lower picture and a part of the upper picture close to the lower part is set to the area of the mask image.

What is claimed is:

1. A projector adapted to project an image, comprising:
   a projection section adapted to project an image;
   an imaging section adapted to image a projection surface on which the image is projected, and output an image obtained by imaging;
   an identification section adapted to identify a projection area in which the image is projected in the projection surface based on the image output by the imaging section;
   a mask processing section adapted to mask an outside of an area, which includes the projection area identified by the identification section, on the image output by the imaging section;

a discrimination section adapted to determine which one of a first state, in which the projector is used alone, and a second state, in which the projector and another projector project images side by side, is set; and a setting section adapted to set an area to be masked by the mask processing section in accordance with a determination result of the discrimination section.

2. The projector according to claim 1, wherein
in a case in which the determination result of the discrimination section is the second state, the setting section sets the area masked on a side of the image, which is projected by the another projector, to be narrower than in the first state.

3. The projector according to claim 1, wherein
the setting section sets a shape of the area masked by the mask processing section in accordance with a positional relationship between the image projected by the projector and the image projected by the another projector.

4. The projector according to claim 1, wherein
in a case in which the determination result of the discrimination section is the second state, the setting section eliminates a part of the image projected by the another projector from the range to be masked, to set the area to be masked to be narrower than in the first state.

5. The projector according to claim 1, wherein
the second state is a state in which the image projected by the projector and the image projected by the another projector one of have contact with, or overlap each other.

6. A method of controlling a projector including a projection section adapted to project an image and an imaging section adapted to image a projection surface on which the image is projected, and output an image obtained by imaging, the method comprising:

identifying a projection area in which the image is projected in the projection surface based on the image output by the imaging section;

masking an outside of an area, which includes the projection area identified in the identifying the projection area, on the image output by the imaging section;

determining which one of a first state, in which the projector is used alone, and a second state, in which the projector and another projector project images side by side, is set; and setting an area to be masked in the masking the outside of the area in accordance with a determination result in the determining of the first state or the second state.

* * * * *